Figure 1:
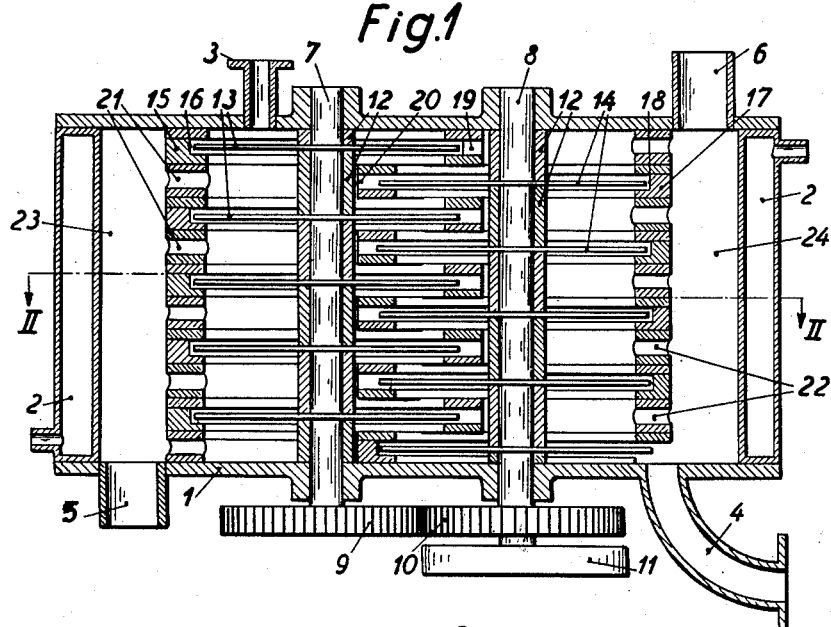

March 30, 1954      A. HANSEN      2,673,802
METHOD OF CONCHING CHOCOLATE AND THE LIKE MASSES, AND
A MACHINE FOR CARRYING-OUT THIS METHOD
Filed April 4, 1950                                    2 Sheets-Sheet 1

INVENTOR.
A. Hansen
BY
Wenderoth, Lind & Ponack
Attorneys

March 30, 1954 A. HANSEN 2,673,802
METHOD OF CONCHING CHOCOLATE AND THE LIKE MASSES, AND
A MACHINE FOR CARRYING-OUT THIS METHOD
Filed April 4, 1950 2 Sheets-Sheet 2
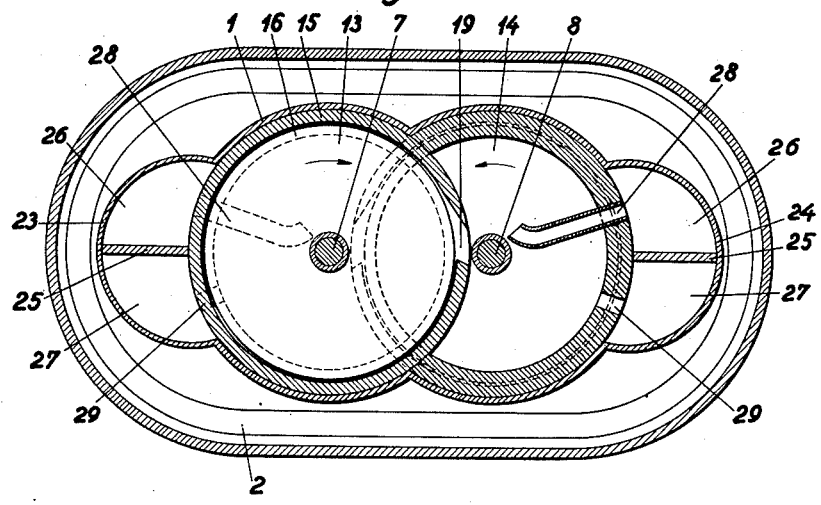
INVENTOR.
A. Hansen
BY
Wenderoth, Lind & Ponack
Attorneys Patented Mar. 30, 1954

2,673,802

UNITED STATES PATENT OFFICE 2,673,802

METHOD OF CONCHING CHOCOLATE AND THE LIKE MASSES, AND A MACHINE FOR CARRYING OUT THIS METHOD

Asgar Hansen, Herlev, near Copenhagen, Denmark, assignor to Mikrovaerk A/S., Soborg, near Copenhagen, Denmark Application April 4, 1950, Serial No. 153,784

Claims priority, application Denmark April 9, 1949

10 Claims. (Cl. 99—23)

For conching chocolate and the like masses a large number of machines are known of mutually different constructions but having the characteristic feature in common that they comprise a trough or another container which can hold a suitable quantity of the mass to be conched, such as 250 to 500 kgs. of said mass or even more.

It is not quite clear which chemical reactions occur in the mass during the conching process but it has been established that the effect of the air on the mass entails certain improvements in the flavor and taste of the mass, and an aim in conching machines in general is, therefore, to bring the mass in such motion that new parts are continuously brought up to the surface to be exposed to the air. For this purpose, some of the existing conching machines, or conches, are provided with a stationary trough-shaped container for holding the mass intended for being conched, so that the surface of the mass lies freely accessible for the air in the container. For producing the necessary motion in the mass a reciprocating drum or one or more corresponding, preferably rotary, bodies may be used which at the same time can serve for mechanically comminuting the mass during the conching process. This mass may by suitable means, such as a heating jacket enclosing the container, be kept at a suitably high temperature during the conching process.

In another group of the conching machines known, the container serving for holding the mass is formed by a rotary drum with horizontal axis of rotation. This drum has a volume amounting to several times the volume of the quantity of the mass to be treated, so that only a comparatively small part of the inside of the drum wall lies under the surface of the mass. During the rotation of the drum, a certain motion is effected in the mass located at the bottom of the drum so that all parts of said mass are successively exposed to the influence of the air in the drum, and furthermore will the drum wall during its motion be coated with a thin film of the mass which is likewise exposed to the influence of the air. At a suitable point in the drum, a scraper or doctor blade may be provided for the removal of the material forming the film, so that the film will constantly be renewed.

In both of the types of conching machines mentioned above it is furthermore known to use a rotary atomizer for the atomization of the mass and thereby for increasing the surface accessible for the air. The atomizer may consist of a fast-rotating roller which on its surface is provided with longitudinal fins which serve for flinging off the mass which is continuously supplied to the surface of the roller. The mass flung off from the fins is once more taken up by the container proper.

A drawback that is common to the known conching machines mentioned above is that the proportion between the surface of the mass accessible for the air and the volume of the charge that is being treated is comparatively small in any machine applicable in practice, while at the same time said surface is renewed only slowly, and for this renewal of the surface a considerable amount of energy is furthermore required, it being necessary to keep the whole charge or the whole mass contained in the trough or container constantly in a vigorous motion. To this must be added that in order to offer a reasonable production capacity the machines known must have very large dimensions which entails high production and operation costs and, furthermore, demands large space for the machines.

Further, conching machines are known having a lower trough in which the mass can be worked by kneading members and from which the mass can by portions be brought up into an upper trough, from which it is carried along by two sets of discs arranged for rotating around a horizontal axis. The two disc sets engage with each other and are mounted in a casing in which a constant renewal of the air is effected. The mass is distributed over the discs in layers of a suitable thickness by means of rules or scrapers and is removed from the discs by other scrapers which lead the mass back to the lower trough for a renewed treatment, i. e. stirring and kneading. Said discs must necessarily rotate at a moderate speed as, otherwise, the mass would not stick to the side faces of the discs, which is a condition for the desired operation of the conch. For the attainment of a satisfactory conching by the application of this known conching machine it will be necessary to let the mass pass through the machine a considerable number of times and, therefore, the conching process becomes rather long and consumes much energy and, further, the machine cannot work continuously but must be completely emptied after the treatment of a charge of the mass.

The present invention relates to a method of conching chocolate and the like masses by which method the mass is spread out for obtaining a large surface, on which the air can act. According to the invention the mass is continuously brought into a rotary or circulating motion for being spread out in the form of a thin film by the action of the centrifugal force. By this method a fully satisfactory conching can be attained at an essentially smaller consumption of energy per unit of the conching mass than by the methods hitherto known, and by the utilization of the centrifugal force for the spreading of the mass over e. g. a number of discs is, amongst other things, gained the advantage that the thickness of the layer or film on the discs can be varied at wish solely by suitably controlling the rate of revolution of the discs. The method of the invention, furthermore, offers the possibility of using a considerable number of rotary discs or other bodies, over which the mass can be spread successively, so that the conching process may be completed during a single passage of the mass through the conching machine used.

According to a preferred embodiment of the method of the invention by which the mass, in a way known, is spread over a number of rotary discs or similar bodies, at least part of the conching air is supplied in the vicinity of the axis of rotation of the rotary discs and is led away at the periphery of the discs. This central air supply is of importance for two reasons. The fact is that, firstly, the sweeping motion of the air over the mass layer on the discs hereby takes place generally in the same direction as the spreading of the mass proper, so that the air will not prevent or oppose the motion of the mass out over the discs and, secondly, the central air supply ensures that a venting is performed over the entire disc surface and not only in an outer annular zone, which would be the case if the full amount of air for the conching was supplied at the periphery of the rotary discs.

The invention furthermore relates to a machine for carrying out the method mentioned above, which machine according to the invention comprises a number of rotary discs or similar bodies having a vertical or substantially vertical axis of rotation and each having at least one face, over which faces the mass is spread successively during the operation of the machine.

The conching machine in accordance with the invention is generally intended for use in combination with one or more storage containers in such a way that through the conching machine and the storage container or containers a circuit is established so that the mass is brought to pass through the conching machine several times. When used in this way, the advantages of the present machine over the machines hitherto known are especially due to the fact that only a small part of the total charge, viz. only the part that is at each moment situated in the conching machine proper, is to be kept in motion for producing the surface accessible for the air, while the remaining part, which will usually be by far the greater part, of the charge is kept at rest in the storage container or containers. Furthermore, it is possible due to the construction of the machine to renew said surface at, practically, any optional velocity by a suitable choice of the number, size, and speed of the rotary discs. Finally should be mentioned that the conching machine proper can be built so as to be very compact so that it requires only very little space in comparison with the existing conching machines and will, furthermore, be essentially cheaper that these to produce, mount, and operate.

The conching machine in accordance with the invention may, however, also be used without any storage container, it being possible to finish the treatment of the mass intended for conching during a single passage through the machine. Hereby the time for the conching process can be reduced considerably on account of the fact that the whole mass is spread out for the formation of a very large surface, whereby the treatment can be strongly intensified in comparison with the course in the existing conching machines.

In accordance with the invention the rotary discs are preferably mounted in a heatable casing, through which can be led a current of air of a temperature suited for the conching process. This temperature will, amongst other things, depend on the nature of the mass to be conched and on the construction and operation velocity of the machine which influence the frictional heat produced by the motion of the mass through the machine. In certain cases the current of air passing through the casing of the machine should consequently be heated, while in other cases a cooling of the air may be required in order that the temperature of the mass being conched should not become disadvantageously high.

The conching machine may, in accordance with the invention, have two or more sets of rotary discs with parallel axes, each disc being surrounded by a collecting channel for collecting the mass flowing out over the disc and communicating with an outlet opening, through which the collected mass can be discharged on a disc of the other or succeeding set of discs at or near the axis of said disc. The construction of the machine will be especially compact when the discs in one disc set, in accordance with the invention, are sandwiched between the discs of the other or succeeding disc set. If there are more than two disc sets, these may in accordance with the invention be mounted in annular manner so that the discs in the last disc set engage between the discs of the first disc set.

Figure 2:
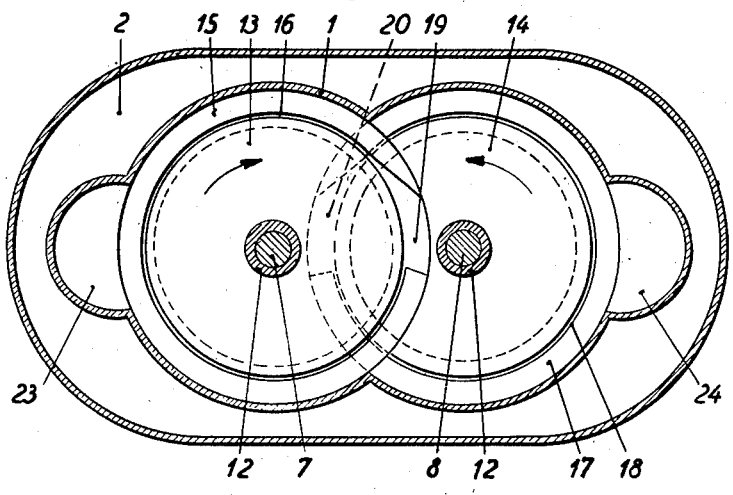

By way of example two embodiments of a conching machine with two sets of rotary discs are illustrated in the drawings in which:

Fig. 1 is a sectional side elevation of the machine,

Fig. 2 a section on the line II—II in Fig. 1, and

Fig. 3 a similar section showing the other embodiment.

Referring to Figs. 1 and 2, the machine has a casing 1 which is enclosed by a water or steam jacket 2 and which is provided with an inlet 3 and an outlet 4 for the mass to be conched, e. g. chocolate, and an inlet 5 and an outlet 6 for the current of air through the casing 1. In the casing, two vertical shafts 7 and 8 are mounted which are in driving connection with each other through gear wheels 9 and 10, and one of which furthermore carries a belt pulley 11. The two shafts 7 and 8 may, however, also be arranged for being driven otherwise; the gear wheels 9 and 10 may e. g. without being mutually engaged be in driving interconnection over a common driving gear wheel, so that both shafts will rotate in the same direction.

The shafts 7 and 8 carry a number of circular discs 13 and 14, respectively, which are clamped between spacing rings 12, said discs partly overlapping or engaging between each other in sandwiched manner. Each of the discs 13 is surrounded by a stationary ring 15 with a groove 16 which is so located in relation to the pertaining disc 13 that between the underside of the outer edge portion of the latter and the bottom of the groove there is only clearance enough left for allowing the rotation of the disc. Corresponding rings 17 with grooves 18 are mounted in the casing 1 around the discs 14 on the shaft 8.

The rings 15 and 17 are provided with outlet openings 19 and 20 which are directed towards the shaft 8 and the shaft 7, respectively, and through which a communication is established from the inlet 3 for the mass to be conched to the discharge outlet 4 from the casing 1. In the rings 15 and 17 proper, or in filling pieces between the latter, openings 21 and 22 are provided which are in communication with ducts or channels 23 and 24 communicating with the air inlet 5 and the air outlet 6, respectively.

The machine shown operates in the following way:

When the shafts 7 and 8 and thereby the discs 13 and 14 are rotating with a suitable speed depending on the nature of the mass to be conched and on the construction of the machine and which may, by way of example, amount to 500 or 1000 revs. per min. or even more, mass is admitted through the inlet 3, while at the same time, e. g. by means of a blower and/or an exhauster, a current of air is produced through the casing 1 of the machine from the inlet 5 to the outlet 6. This current of air may, depending on the circumstances, be heated.

From the inlet 3 the mass is discharged onto the upper disc 13 near the centre thereof, and on account of the rotation of the disc the mass is, practically, instantaneously spread as a thin film over the upper face of the disc. The mass is flung outwards with a considerable force and is then collected in the groove 16 in the upper ring 15, and from this groove the mass flows to the outlet opening 19 through which it is discharged onto the upper disc 14 of the other set near the centre of said disc. On this disc another spreading of the mass occurs, the mass being collected in the groove 18 in the upper ring 17 and through the outlet opening 20 thereof discharged for a renewed spreading operation on the upper disc but one, 13 of the first set. In this way the mass is successively caused to spread over all of the discs 13 and 14 and will finally flow off through the outlet 4 for further treatment or to a magazine.

The outlet openings 19 and 20 may, as shown, open tangentially from the respective grooves 16 and 18. This is not, however, necessary for the functioning of the machine. When the outlet openings, as shown, are directed towards the shaft of the other disc set, the outflowing mass will be especially well distributed on account of the fact that during its motion the mass will hit against these shafts or, in the embodiment shown, against the spacers 12 mounted on the shafts. Hereby is ensured that the mass will start its motion out over the discs 13 and 14 at the central portions of these discs.

During the passage of the mass through the casing 1 from the inlet 3 to the outlet 4, its individual parts are repeatedly exposed to the current of air passing through the casing at the same time, whereby a comparatively short but very intensive treatment (conching) of the mass occurs. The temperature of the mass may during this treatment be adjusted at the most advantageous value by a suitable choice of the temperature in the current of air and in the water or steam jacket 2. The shafts 7 and 8 may be hollow as shown, in which case there may through said shafts be led a current of heating or cooling medium, e. g. air, which may furthermore be utilized in the conching process by being brought to flow out over the discs 13 and 14 through suitable openings in the shaft walls.

The conching machine shown may form part of a larger plant, it being possible to have the inlet 3 connected to the outlet of a preceding machine of the same kind, and the outlet 4 may likewise be in communication with the inlet of the casing of a succeeding conching machine. In this case it will prove most expedient to produce a common air circuit through all of the machines.

The size or production capacity of the machine may be amended in several ways, e. g. by alteration of the size of the discs or the number of discs in each disc set or the number of disc sets or by a combination of these different ways. Likewise, the effective surface area of each disc may be increased, without a simultaneous alteration of the diameter, by corrugating or waving the discs radially or peripherally, if only care is always taken to provide for a sufficient sealing between the undersides of the discs and the bottoms of the pertaining grooves or collecting channels, so that during its passage through the machine the mass is forced to pass across all of the discs.

If desired, the discs may at their circumference be provided with saw-toothshaped teeth or similar projections for crushing and grinding the particles of the mass that is being conched.

In the embodiment shown in Fig. 3 the machine is, generally, built like the machine illustrated in Figs. 1 and 2, and similar parts are designated by identical numerals. However, according to Fig. 3 each of the ducts or channels 23 and 24 are divided by a partition 25 in an air supply duct 26 and an air discharge duct 27 for each of the disc sets. The ducts 26 are in communication with a number of tubes 28 which are secured in the rings 15 and extend inwards towards the shaft 7 or 8 of the pertaining disc set in the clearance space between the discs 13 or 14. As shown in the drawing, the inner ends of these tubes may advantageously be bent in such a way that their discharge opening is turned in the direction in which the adjacent disc portions move during the rotation of the discs. The air supplied through the ducts 26 flows in through the tubes 28 and is in this way delivered to the discs near the axis of the latter. From this point the air spreads over the discs and flows out to the exhaust ducts 27 through openings 29 in the rings 15. In this way the air is brought to flow out over the discs in substantially the same direction as the mass being conched, whereby the motion of the latter is not opposed by the flow of air.

Other ways may be used to obtain the desired motion of the air in relation to the discs. By way of example, a single common air supply duct 26 may be used which is in communication with a number of tube groups 28 corresponding to the number of disc sets, and the exhaust of the air from the disc sets may likewise take place through a single exhaust duct 27. If it be desired, measures may be taken for leading away, contingently sucking away, the air at several points spaced along the periphery of the discs.

It appears already from the above explanation that the conching machine in accordance with the invention is not limited to the embodiments shown on the drawing but may be amended in numerous ways. Here it shall furthermore be pointed out that the discs in the different disc sets need not engage between each other, if only such channels or conduits are provided that during its passage through the machine the mass is succeedingly supplied to the different discs at or near the axes of rotation thereof. It is evident that if two or more disc sets are provided, the most compact construction is obtained when the disc sets are mounted as shown on the drawings. However, it is also possible to use only a single set of rotary discs, and in this case the mass may be led from one disc to the next through a funnel, the upper and widest end of which encloses the former disc for catching the mass flung out over said disc, while the discharge end of the funnel is located over the central portion of the succeeding disc. Finally should be pointed out that each disc set or part of each disc set may be replaced by a single drum-shaped body with a suitable number of radially extending fins, over which the mass is spread successively.

I claim:

1. In conching confectionary masses, the steps of feeding the mass successively to a plurality of rotative disc-shaped bodies, rotating said bodies around a substantially vertical axis at such rate of revolution that the mass is centrifugally flung away from the axis of rotation to form a film over the upper surface of said bodies, and admitting conching air to said film.

2. A method of conching confectionary masses as claimed in claim 1, wherein at least part of the conching air is supplied in the vicinity of said axis of rotation to sweep over said film towards the periphery of said rotary disc-shaped bodies, and is carried away from said periphery.

3. An apparatus for conching confectionary masses, comprising a casing, vertical axes mounted in said casing, at least two sets of disc-shaped bodies mounted in said casing for rotation around said vertical axes, means for feeding the mass to be conched to the upper body of one of said sets of disc-shaped bodies, a mass collecting channel surrounding the periphery of each of said bodies, an outlet in each of said channels to discharge the collected mass on a disc-shaped body of another set of bodies at a distance within the periphery thereof, means for discharging the mass from said casing after its passage over the lowermost disc-shaped body, means for admitting conching air to said bodies, and means for rotating said disc-sets around said axes at such rate of revolution that the mass is centrifugally spread over said discs.

4. An apparatus as claimed in claim 3 wherein said disc-shaped bodies of one set are sandwiched between the bodies of another set.

5. An apparatus as claimed in claim 3, wherein each of the mass collecting channels surrounding said disc-shaped bodies is provided in a separate ring mounted detachably in said casing.

6. An apparatus as claimed in claim 3, wherein each of said mass collecting channels is provided with a substantially tangential outlet to direct the collected mass towards the shaft carrying the disc-shaped bodies of said other set of bodies.

7. An apparatus for conching confectionary masses, comprising a casing, vertical axes mounted in said casing, at least two sets of disc-shaped bodies mounted in said casing for rotation around said vertical axes, means for successively supplying mass to be conched to said disc-shaped bodies, said means comprising an inlet for discharging the mass to the upper body of one of said sets of disc-shaped bodies and a mass collecting channel surrounding the periphery of each of said bodies, each of said channels having an outlet to discharge the collected mass on a disc-shaped body of another set of bodies at a distance within the periphery thereof, and an outlet for discharging the mass from said casing after its passage over the lowermost disc-shaped body, the apparatus further comprising inlet and outlet channels in said casing for a flow of conching air to sweep said disc-shaped bodies, said inlet and outlet channels having communication with the space containing said sets of disc-shaped bodies.

8. An apparatus as claimed in claim 7, wherein means are provided to guide the conching air supplied through said inlet channel inwardly towards the axis of rotation of the pertaining set of disc-shaped bodies and to discharge said air over a radially inner portion of said bodies.

9. An apparatus as claimed in claim 7, wherein said inlet channel communicates with one end of a series of tubes extending between said disc-shaped bodies towards the axis of rotation, the discharge openings of said tubes being turned in the direction of rotation of said disc-shaped bodies.

10. An apparatus as claimed in claim 7, wherein each of the spaces between the disc-shaped bodies of one set communicates through at least one opening with said conching air outlet channel.

ASGAR HANSEN.

References Cited in the file of this patent

UNITED STATES PATENTS

| Number | Name | Date |
|---|---|---|
| 49,626 | Heneage | Aug. 29, 1865 |
| 309,574 | Sergeant | Dec. 23, 1884 |
| 546,830 | Smith | Sept. 24, 1895 |
| 1,139,815 | Slaysman | May 18, 1915 |
| 1,290,734 | Goodhue | Jan. 7, 1919 |
| 1,309,175 | Becht | July 8, 1919 |
| 2,169,338 | Ditto | Aug. 15, 1939 |
| 2,189,779 | Daman | Feb. 13, 1940 |
| 2,216,777 | Hollstein | Oct. 8, 1940 |
| 2,255,213 | Good | Sept. 9, 1941 |
| 2,327,281 | McCashen | Aug. 17, 1943 |
| 2,348,473 | Hollstein | May 9, 1944 |
| 2,484,509 | Hopkins | Oct. 11, 1949 |